US011320627B2

(12) United States Patent
Sakai et al.

(10) Patent No.: US 11,320,627 B2
(45) Date of Patent: May 3, 2022

(54) LENS BARREL AND IMAGING DEVICE

(71) Applicant: NIKON CORPORATION, Tokyo (JP)

(72) Inventors: Takahiro Sakai, Tokyo (JP); Yuji Ihara, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 71 days.

(21) Appl. No.: 17/022,709

(22) Filed: Sep. 16, 2020

(65) Prior Publication Data

US 2020/0409031 A1   Dec. 31, 2020

Related U.S. Application Data

(63) Continuation of application No. 16/310,932, filed as application No. PCT/JP2018/021173 on Jun. 1, 2018, now Pat. No. 10,809,490.

(30) Foreign Application Priority Data

Jun. 2, 2017   (JP) .............................. JP2017-110463

(51) Int. Cl.
| | | |
|---|---|---|
| G02B 7/04 | (2021.01) | |
| G02B 7/10 | (2021.01) | |
| G02B 7/08 | (2021.01) | |
| G03B 1/00 | (2021.01) | |
| G02B 7/02 | (2021.01) | |
| G02B 15/14 | (2006.01) | |

(52) U.S. Cl.
CPC .............. *G02B 7/102* (2013.01); *G02B 7/021* (2013.01); *G02B 7/04* (2013.01); *G02B 7/08* (2013.01); *G02B 7/10* (2013.01); *G02B 15/145* (2019.08); *G03B 1/00* (2013.01)

(58) Field of Classification Search
CPC .......... G02B 7/021; G02B 7/023; G02B 7/10; G02B 7/102; G02B 7/04
USPC ......................... 359/700, 701, 723, 724, 726
See application file for complete search history.

(56) References Cited

U.S. PATENT DOCUMENTS

| | | | |
|---|---|---|---|
| 5,018,843 A | 5/1991 | Inadome et al. | |
| 2007/0171546 A1 | 7/2007 | Todani et al. | |
| 2010/0033845 A1 | 2/2010 | Todani | |
| 2011/0141589 A1* | 6/2011 | Shintani | G02B 7/102 |
| | | | 359/826 |

(Continued)

FOREIGN PATENT DOCUMENTS

| | | |
|---|---|---|
| JP | 2007-279584 A | 10/2007 |
| JP | 2007-282092 A | 10/2007 |
| JP | 2008-046200 A | 2/2008 |

(Continued)

OTHER PUBLICATIONS

Sep. 4, 2018 Search Report issued in International Patent Application No. PCT/JP2018/021173.

(Continued)

*Primary Examiner* — Darryl J Collins

(74) *Attorney, Agent, or Firm* — Oliff PLC

(57) ABSTRACT

A lens barrel including a first lens, an actuator that drives the first lens, a first barrel that holds a first cam follower and the actuator and moves in an optical axis direction, a second lens, and a second barrel that holds a second cam follower and the second lens and moves in the optical axis direction, the second barrel having a first hole portion in which the first cam follower is disposed.

13 Claims, 13 Drawing Sheets

(56) References Cited

U.S. PATENT DOCUMENTS

2016/0077304 A1* 3/2016 Nagao .................. G02B 7/102
                                                                                        359/700
2017/0261722 A1* 9/2017 Miyoshi ................ G03B 17/00

FOREIGN PATENT DOCUMENTS

JP        2010-044102 A    2/2010
JP        20 15-045791 A    3/2015

OTHER PUBLICATIONS

Sep. 4, 2018 Written Opinion issued in International Patent Application No. PCT/JP2018/021173.
Jun. 17, 2020 Notice of Allowance Issued in U.S. Appl. No. 16/310,932.
Jun. 22, 2021 Office Action issued in Chinese Patent Application No. 201880002602.7.

* cited by examiner

FIG. 5
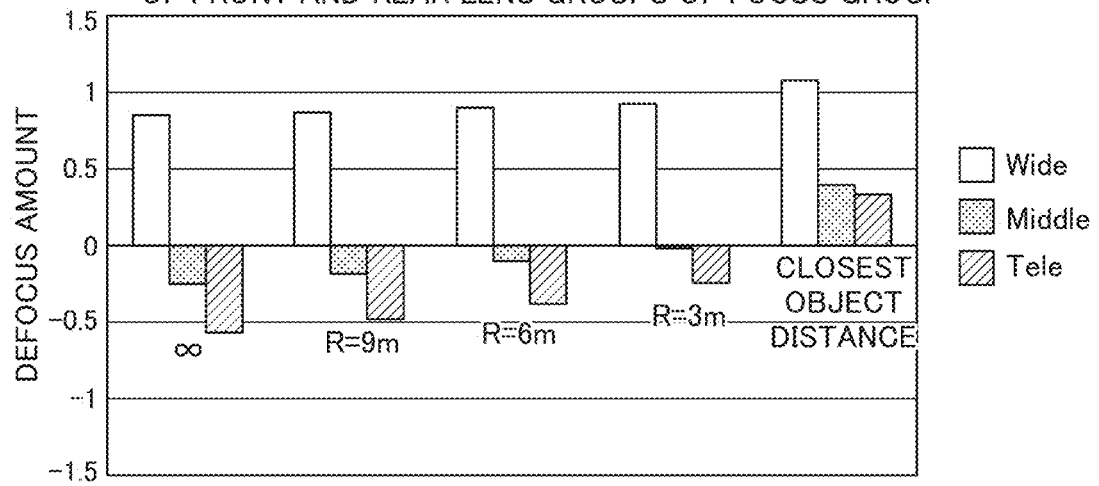
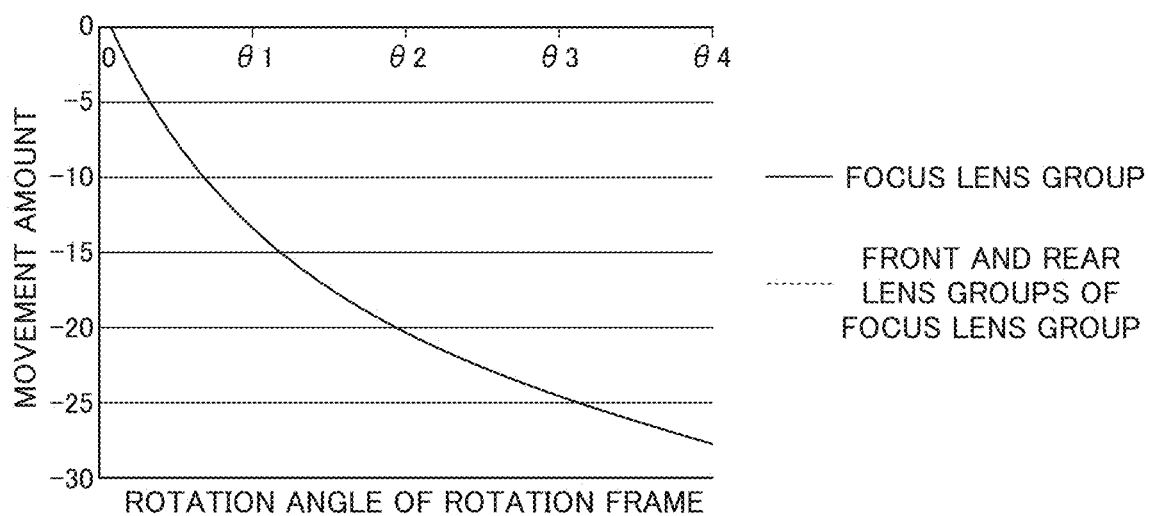

FIG. 11
(A)
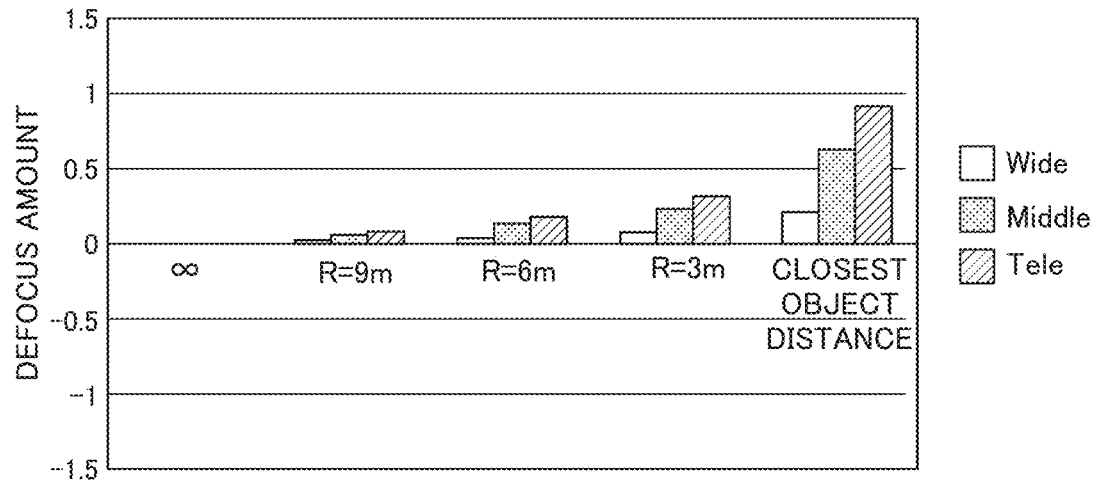
(B)
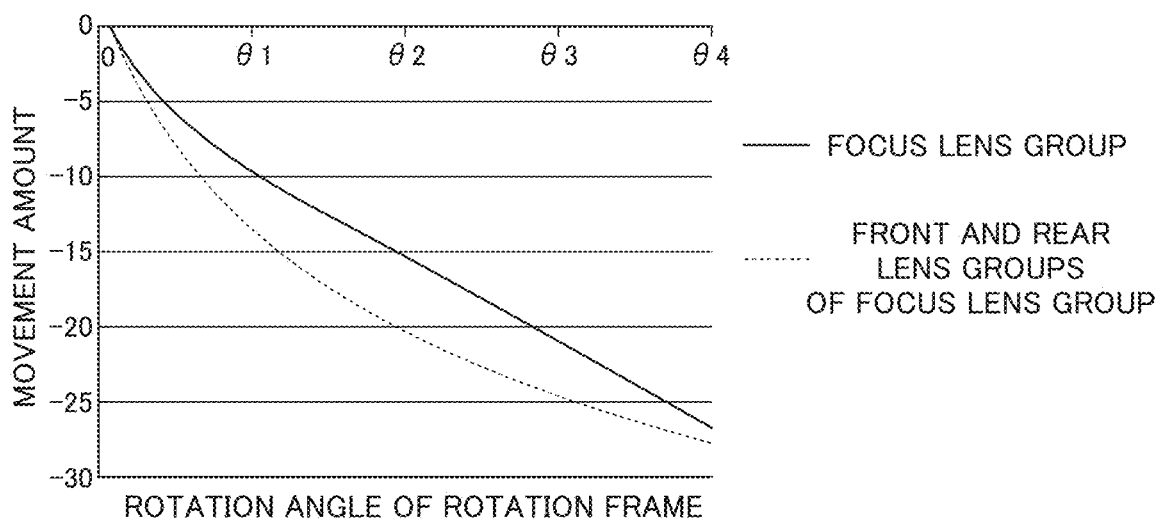

FIG. 13
(A)
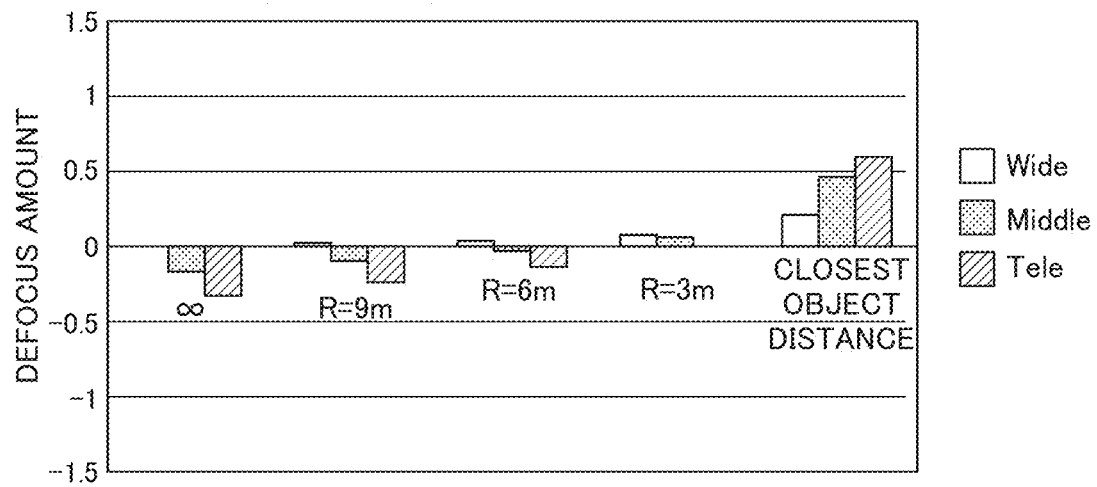
(B)
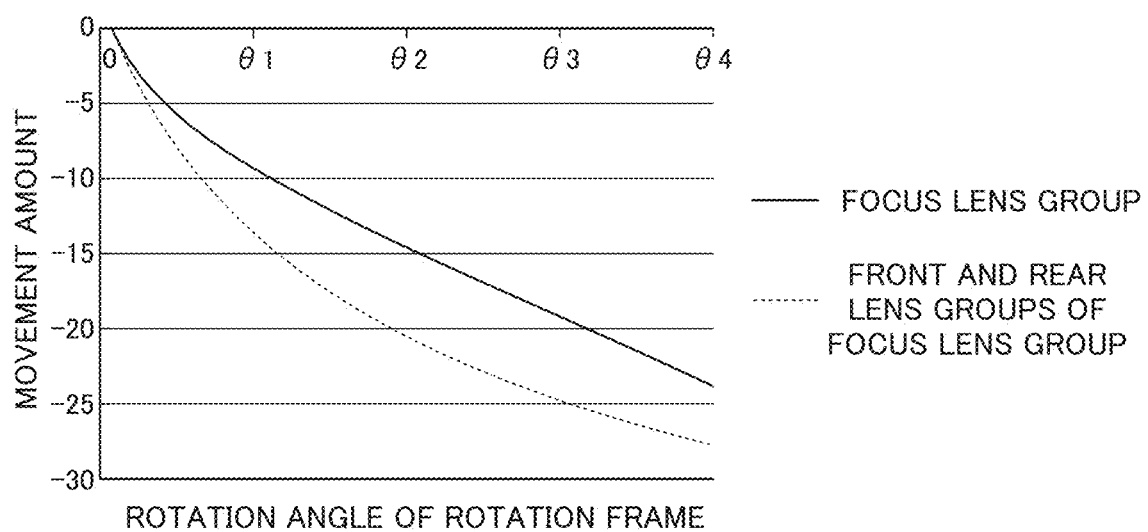

US 11,320,627 B2

LENS BARREL AND IMAGING DEVICE

CROSS-REFERENCE TO RELATED APPLICATION

This is a Continuation of application Ser. No. 16/310,932 filed Dec. 18, 2018, which in turn is a National Phase Application of PCT/JP2018/021173 filed Jun. 1, 2018, which claims the benefit of Japanese Patent Application No. 2017-110463 filed Jun. 2, 2017. The disclosure of each of the prior applications is hereby incorporated by reference herein in its entirety.

TECHNICAL FIELD

The present invention relates to a lens barrel and an imaging device.

Priority is claimed on Japanese Patent Application No. 2017-110463 filed Jun. 2, 2017, the content of which is incorporated herein by reference.

BACKGROUND ART

Conventionally, lens barrels of inner focus type that adjust a focus by moving a focus lens disposed between a first zoom lens and a second zoom lens in a plurality of lenses in an optical axis direction are known (for example, refer to Patent Literature 1).

On the other hand, in zoom lenses, an object may become out of focus when an object distance changes during zooming.

CITATION LIST

Patent Literature

[Patent Literature 1]
Japanese Patent Application Publication No. 2010-44102

SUMMARY OF INVENTION

An aspect of the present invention provides a lens barrel including a first lens, an actuator that drives the first lens, a first barrel that holds a first cam follower and the actuator and moves in an optical axis direction, a second lens, and a second barrel that holds a second cam follower and the second lens and moves in the optical axis direction, the second barrel having a first hole portion in which the first cam follower is disposed.

BRIEF DESCRIPTION OF DRAWINGS

FIG. 5 is a view showing an example of a defocus amount of the lens barrel when a shape of a cam groove of a second cam groove and a shape of a cam groove of a third cam groove are the same.

FIG. 11 is a view showing an example of a defocus amount of a lens barrel according to a shape of a cam groove of a second cam groove and a shape of a cam groove of a third cam groove.

FIG. 13 is a view showing an example of a defocus amount of a lens barrel according to a shape of a cam groove of a second cam groove and a shape of a cam groove of a third cam groove.

DESCRIPTION OF EMBODIMENTS

Hereinafter, a lens barrel will be described with reference to the drawings. In each of the following drawings, an XYZ orthogonal coordinate system is provided to facilitate explanation and understanding. In this coordinate system, a direction toward an object is a −X direction at a position of a camera (imaging device) when a photographer captures a landscape image with an optical axis AX as the horizontal (hereafter referred to as a normal position). Also, a direction toward a left side when viewed from the photographer is a +Y direction. Further, a vertical direction at the normal position is a +Z direction. In the following description, a direction parallel to the optical axis AX will also be described simply as an optical axis direction.

1. Lens Group Configuration

Figure 1:
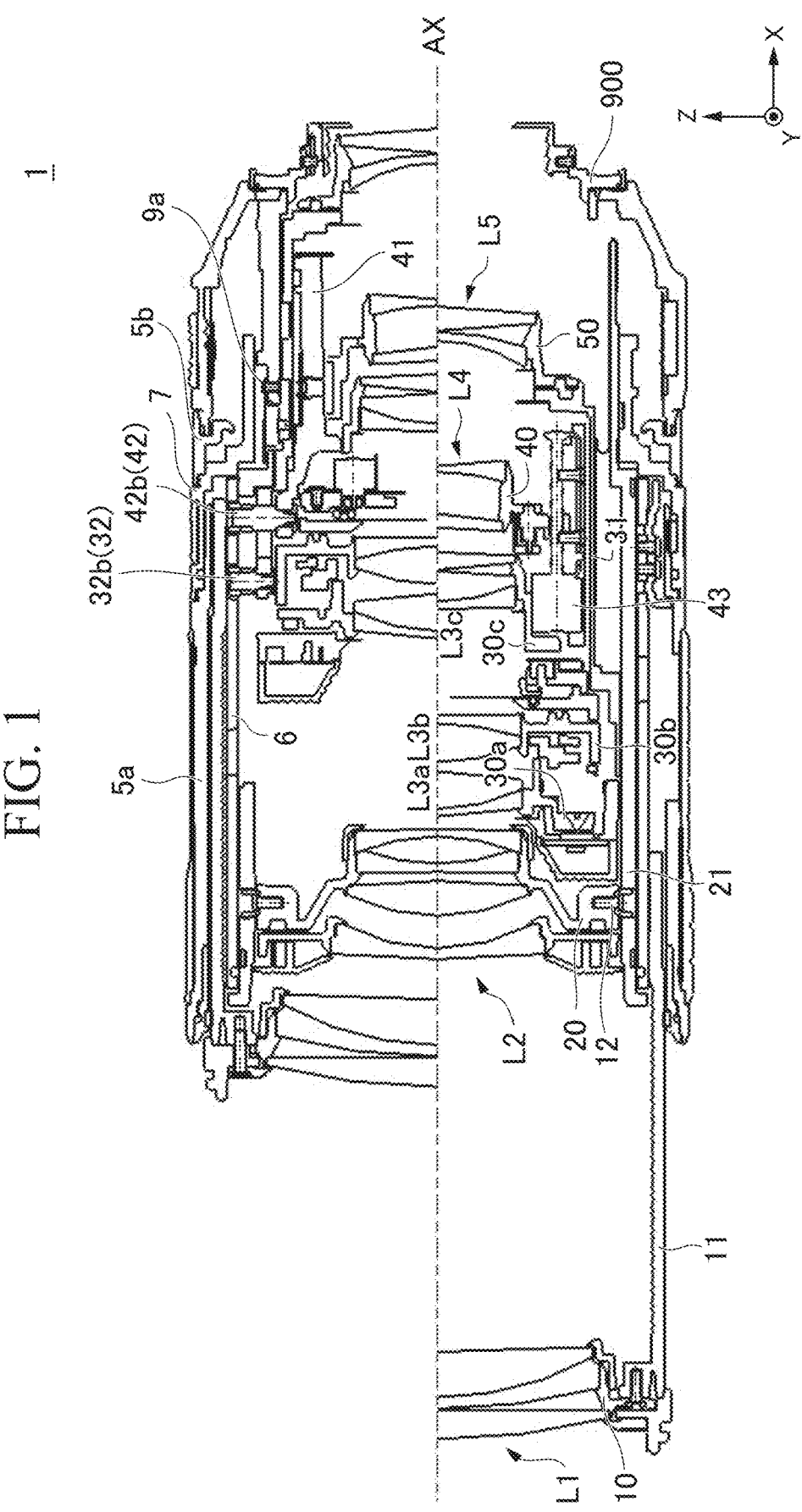
FIG. 1 is a cross-sectional view illustrating a telephoto end imaging state and a wide-angle end imaging state of a lens barrel.
Figure 15:
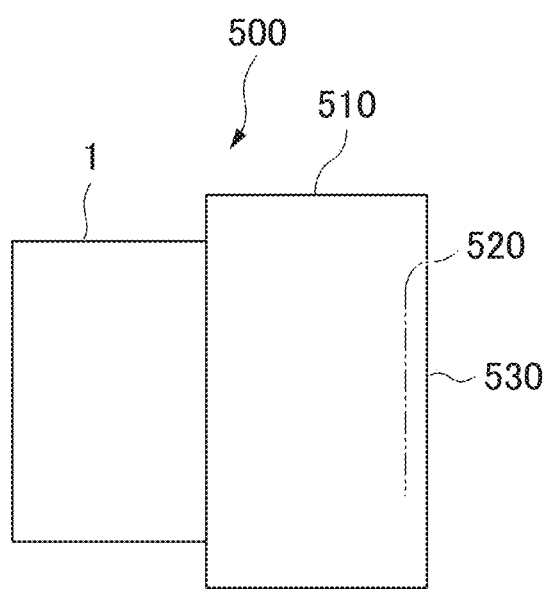
FIG. 15 is a view schematically illustrating an example of a camera (imaging device).

FIG. 1 is a cross-sectional view illustrating a telephoto end imaging state and a wide-angle end imaging state of the lens barrel 1. In FIG. 1, an upper half of the paper surface illustrates the lens barrel 1 in the wide-angle end imaging state, and a lower half of the paper surface illustrates the lens barrel 1 in the telephoto end imaging state. The lens barrel 1 is attachable to and detachable from a camera main body. In another example, there may be a camera in which the lens barrel 1 is fixed to a camera main body and not detachable therefrom. In one example of a camera (imaging device) 500 illustrated in FIG. 15, a camera main body (main body portion) 510 includes an imaging device 520 and a display unit 530.

The lens barrel 1 includes a variable-power optical system having a plurality of lens groups. In one example, the lens barrel 1 includes a zoom lens in which a first lens group L1, a second lens group L2, a third lens group L3, a fourth lens group L4, and a fifth lens group L5 are included from a −X side in the +X direction.

The first lens group L1, the third lens group L3, the fourth lens group L4, and the fifth lens group L5 are lens groups that move in the optical axis direction at the time of zooming. The second lens group L2 is a fixed lens group that does not move in the optical axis direction at the time of zooming. The fourth lens group L4 includes a focus lens and moves in the optical axis direction at the time of focusing.

The first lens group L1 is held by a first lens holding frame 10. The first lens holding frame 10 is held by a first lens moving barrel 11. A first lens unit 100 includes the first lens group L1, the first lens holding frame 10, and the first lens moving barrel 11.

The second lens group L2 is held by a second lens holding frame 20. The second lens holding frame 20 is held by a second lens fixed barrel 21. A second lens unit 200 includes the second lens group L2, the second lens holding frame 20, and the second lens fixed barrel 21.

The third lens group L3 includes a third lens group L3a, a third lens group L3b, and a third lens group L3c. The third lens group L3a is a VR lens group (vibration reduction lens group). A diaphragm unit 8 is disposed between the third lens group L3b and the third lens group L3c. The third lens groups L3a, L3b, and L3c are respectively held by third lens holding frames 30a, 30b, and 30c. The third lens holding frames 30a, 30b, and 30c are held by a third/fifth lens moving barrel 31.

The fifth lens group L5 is held by a fifth lens holding frame 50. The fifth lens holding frame 50 is held by the third/fifth lens moving barrel 31. That is, both the third lens group L3 and the fifth lens group L5 are held by the third/fifth lens moving barrel 31 via the respective lens holding frames. A third/fifth lens unit 300 includes the third lens groups L3a to L3c, the third lens holding frames 30a to 30c, the fifth lens group L5, the fifth lens holding frame 50, and the third/fifth lens moving barrel 31. In the present embodiment, the third/fifth lens moving barrel 31 includes the third lens group L3 and the fifth lens group L5 and integrally moves. The present invention is not limited thereto. In another embodiment, the third lens group L3 and the fifth lens group L5 may be included in individual moving barrels and may be configured to move individually.

The fourth lens group L4 is held by a fourth lens holding frame 40. The fourth lens holding frame 40 is held by a fourth lens moving barrel 41. The fourth lens moving barrel 41 holds an actuator 43. The fourth lens group L4 and the fourth lens holding frame 40 move in the optical axis direction due to the actuator 43. A focus lens unit 400 includes the fourth lens group L4, the fourth lens holding frame 40, the fourth lens moving barrel 41, and the actuator 43.

A focal distance of the lens barrel 1 changes according to zooming. Also, an object distance (or focus position) of the lens barrel 1 changes according to focusing. The term "object distance" described herein is a distance from a camera to an object. More specifically, the object distance is a distance from a reference position of a camera to an object in focus. The focus position is a position of an object in focus.

The lens barrel 1 is a so-called inner focus type lens barrel in which the fourth lens group L4 serving as the focus lens is disposed between the third lens group L3 and the fifth lens group L5 which is a zoom lens.

2. Overall Configuration

Next, each constituent member included in the lens barrel 1 will be described.

As illustrated in FIG. 1, the lens barrel 1 includes the first lens unit 100, the second lens unit 200, the third/fifth lens unit 300, the focus lens unit 400, a zoom operation ring 5a, a focus operation ring 5b, a rotary barrel 6, an intermediate fixed barrel 7, the diaphragm unit 8, a zoom detection unit 9a, a focus detection unit 9b (see FIG. 8), and a mount 900.

The zoom operation ring 5a and the focus operation ring 5b rotate in a circumferential direction about the optical axis AX of the lens groups according to an operation of a photographer. As the zoom operation ring 5a rotates, the first lens group L1, the third lens group L3, the fourth lens group L4, and the fifth lens group L5 are moved in the optical axis direction, and thereby a focal distance of the lens barrel 1 is changed. Also, as the focus operation ring 5b rotates, the actuator 43 is driven and the fourth lens group L4 is moved in the optical axis direction. Thereby, a focusing operation is performed.

The diaphragm unit 8 is disposed between the third lens group L3b and the third lens group L3c, and adjusts an amount of light. The zoom detection unit 9a may be, for example, a potentiometer. The zoom detection unit 9a is included in the second lens fixed barrel 21, and can detect a rotation amount of the zoom operation ring 5a and the focal distance. For example, the zoom detection unit 9a relates to a zoom detection cam (not illustrated) formed in the third/fifth lens moving barrel 31. The focus detection unit 9b (see FIG. 8) may be, for example, a photointerrupter. The focus detection unit 9b is included in the fourth lens moving barrel 41 and detects a rotation amount of the focus operation ring 5b. For example, the focus detection unit 9b relates to a light shielding plate included in the focus operation ring 5b.

At least a portion of the first lens moving barrel 11 is disposed on a radial inner side (on an inner circumferential side) of the zoom operation ring 5a. At least a portion of the rotary barrel 6 is disposed on a radial inner side of the zoom operation ring 5a. At least a portion of the second lens fixed barrel 21 is disposed on a radial inner side of the rotary barrel 6. At least a portion of the third/fifth lens moving barrel 31 is disposed on a radial inner side of the second lens fixed barrel 21. At least a portion of the fourth lens moving barrel 41 is disposed on a radial inner side of the third/fifth lens moving barrel 31.

Figure 2:
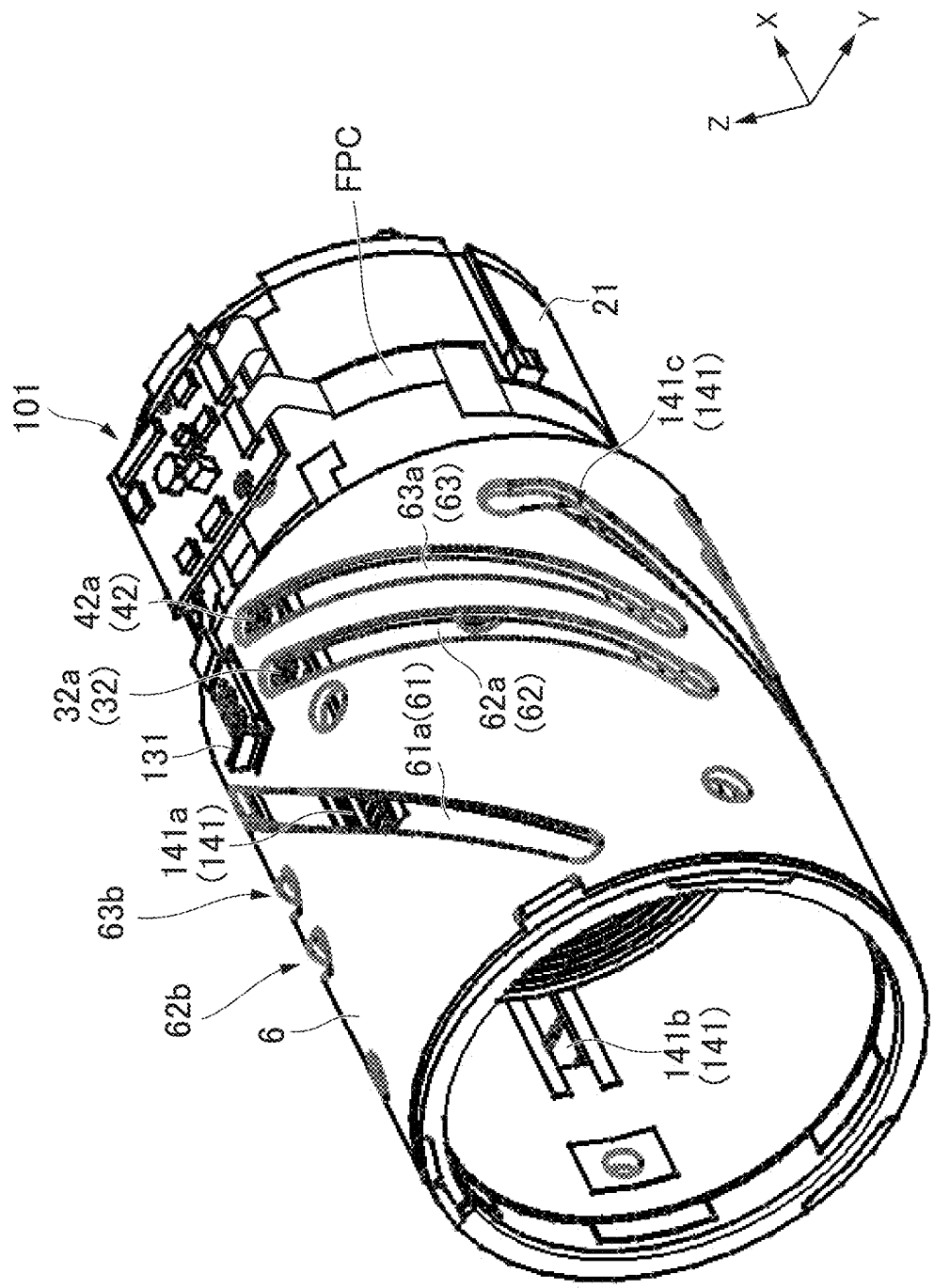
FIG. 2 is a view illustrating an example of an external configuration of a rotary barrel and a second lens fixed barrel.

As illustrated in FIG. 2, the rotary barrel 6 includes a first cam groove 61, a second cam groove 62, and a third cam groove 63. The first cam groove 61 engages with a cam follower 12 included in the first lens moving barrel 11. The second cam groove 62 engages with a cam follower 32 included in the third/fifth lens moving barrel 31. The third cam groove 63 engages with a cam follower 42 included in the fourth lens moving barrel 41. As the zoom operation ring 5a rotates, the rotary barrel 6 also rotates. As the rotary barrel 6 rotates, the first lens group L1, the third lens group L3, the fourth lens group L4, and the fifth lens group L5 move in the optical axis direction via each of the cam followers 12, 32, and 42 and each of the cam grooves 61, 62, and 63.

2-1. Rotary Barrel 6

FIG. 2 is a view illustrating an example of an external configuration of the rotary barrel 6 and the second lens fixed barrel 21. The rotary barrel 6 rotates in the circumferential direction around the optical axis AX due to a force applied to the zoom operation ring 5a. Specifically, the rotary barrel 6 is engaged with the zoom operation ring 5a by a rotation interlocking portion 131, a rotational force applied to the zoom operation ring 5a is transferred to the rotary barrel 6 via the rotation interlocking portion 131, and thereby the rotary barrel 6 rotates around the optical axis AX. In the present embodiment, the zoom operation ring 5a and the rotary barrel 6 are mechanically interlocked to move each of the lens groups. The present invention is not limited thereto. In another embodiment, there may be a configuration in which each of the lens groups may be electrically moved utilizing an actuator. In one example, when it is detected that a user has performed a zoom operation using an operation unit such as a zoom operation ring, a zoom lever, or a touch panel, the actuator may be driven and the rotary barrel may be rotated. Alternatively, the actuator may be driven to move each of the moving barrels. A movement of the rotary barrel 6 in the optical axis direction with respect to the second lens fixed barrel 21 is restricted.

The rotary barrel 6 includes at least one of a first cam groove 61a, a first cam groove 61b, and a first cam groove 61c. The first cam groove 61a, the first cam groove 61b, and the first cam groove 61c are respectively disposed at angularly different positions on a circumference around the optical axis AX. In the following description, the first cam groove 61a, the first cam groove 61b, and the first cam groove 61c will also be described collectively as the first cam groove 61 unless they are distinguished from each other. The first cam groove 61 engages with the cam follower 12 provided on an inner circumferential side of the first lens moving barrel 11.

The rotary barrel 6 includes at least one of a second cam groove 62a, a second cam groove 62b, and a second cam groove 62c. The second cam groove 62a, the second cam groove 62b, and the second cam groove 62c are respectively disposed at angularly different positions on the circumference about the optical axis AX. In the following description, the second cam groove 62a, the second cam groove 62b, and the second cam groove 62c will also be described collectively as the second cam groove 62 unless they are distinguished from each other. The second cam groove 62 engages with the cam follower 32 included in the third/fifth lens moving barrel 31.

The rotary barrel 6 includes at least one of a third cam groove 63a, a third cam groove 63b, and a third cam groove 63c. The third cam groove 63a, the third cam groove 63b, and the third cam groove 63c are respectively disposed at (angularly) different locations on the circumference about the optical axis AX. In the following description, the third cam groove 63a, the third cam groove 63b, and the third cam groove 63c will also be described collectively as the third cam groove 63 unless they are distinguished from each other. The third cam groove 63 engages with the cam follower 42 included in the fourth lens moving barrel 41.

In the present embodiment, the above-described first cam groove 61, second cam groove 62, and third cam groove 63 are through holes. In another embodiment, the first cam groove 61 may not be included in the rotary barrel 6, and may be included in another barrel. Further, a cam groove need not necessarily be a through hole, and may be a groove in which at least a portion thereof does not pass through a barrel body.

2-2. Second Lens Fixed Barrel 21

Figure 3:
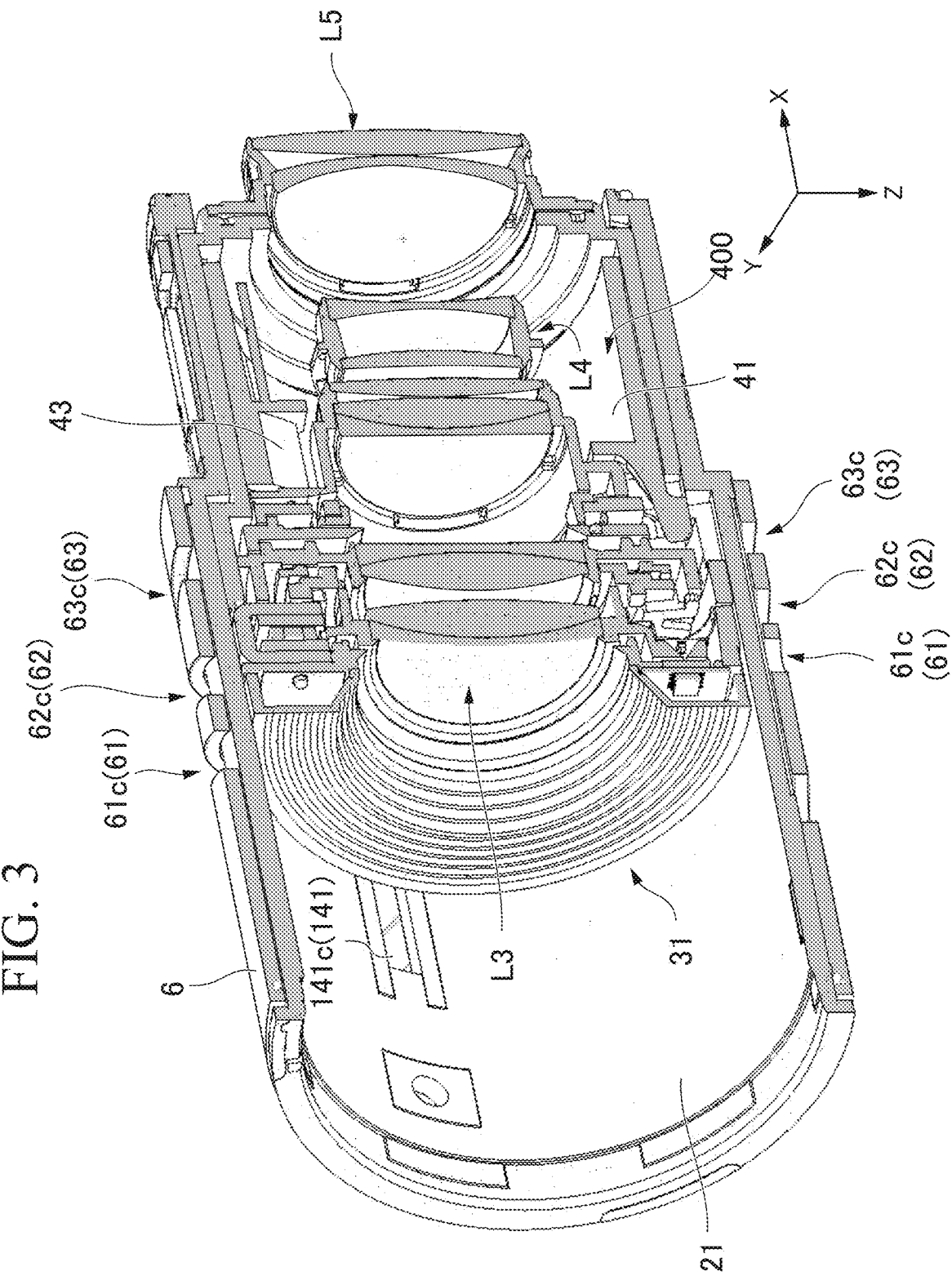
FIG. 3 is a view illustrating an example of a cross section of the lens barrel.

Next, the second lens fixed barrel 21 will be described with reference to FIGS. 2, 3, and the like. FIG. 3 is a view illustrating an example of a cross section of the lens barrel 1. The second lens fixed barrel 21 includes at least one rectilinear groove of a rectilinear groove 141a, a rectilinear groove 141b, and a rectilinear groove 141c. The rectilinear groove 141a, the rectilinear groove 141b and the rectilinear groove 141c are through holes extending in the optical axis direction. In the following description, the rectilinear groove 141a, the rectilinear groove 141b, and the rectilinear groove 141c will also be described collectively as a rectilinear groove 141 unless they are distinguished from each other. The cam follower 32 provided on an outer circumferential side of the third/fifth lens moving barrel 31 passes through the rectilinear groove 141 and engages with the second cam groove 62 included in the rotary barrel 6. That is, the cam follower 32 is disposed in the rectilinear groove 141. The cam follower 42 provided on an outer circumferential side of the fourth lens moving barrel 41 passes through the rectilinear groove 141 and engages with the third cam groove 63 included in the rotary barrel 6. That is, the cam follower 42 is disposed in the rectilinear groove 141.

2-3. Third/Fifth Lens Moving Barrel 31

Figure 6:
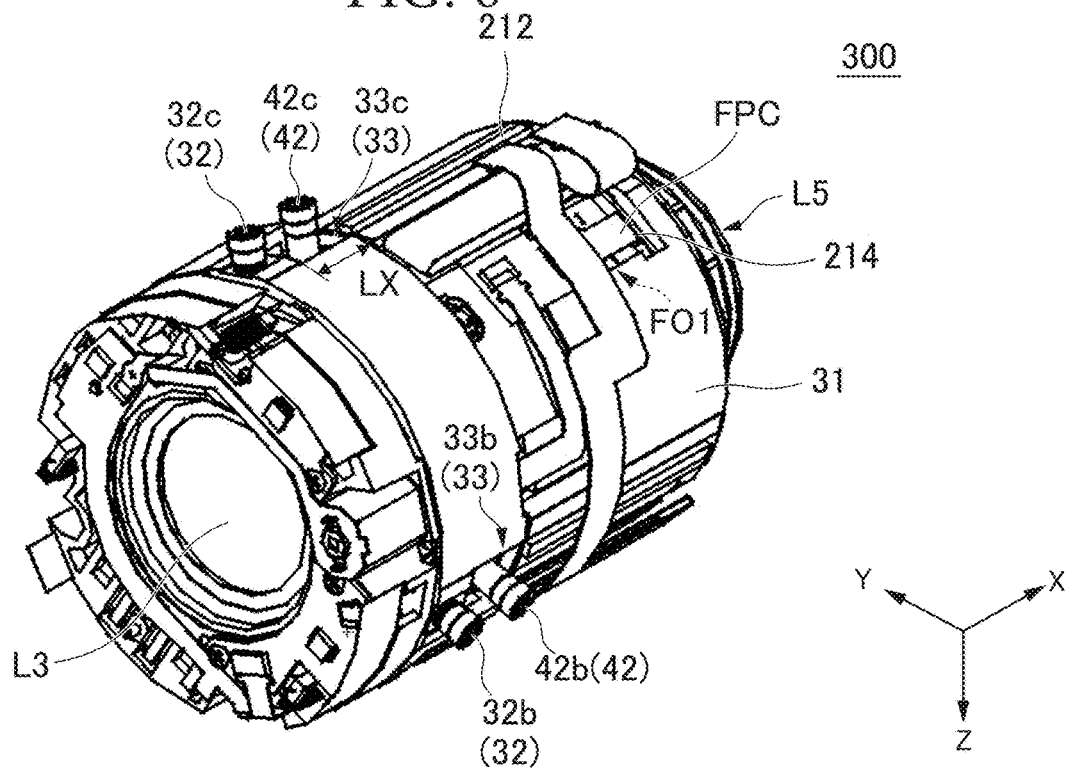
FIG. 6 is a view illustrating an example of an external configuration of a third/fifth lens moving barrel.
Figure 7:
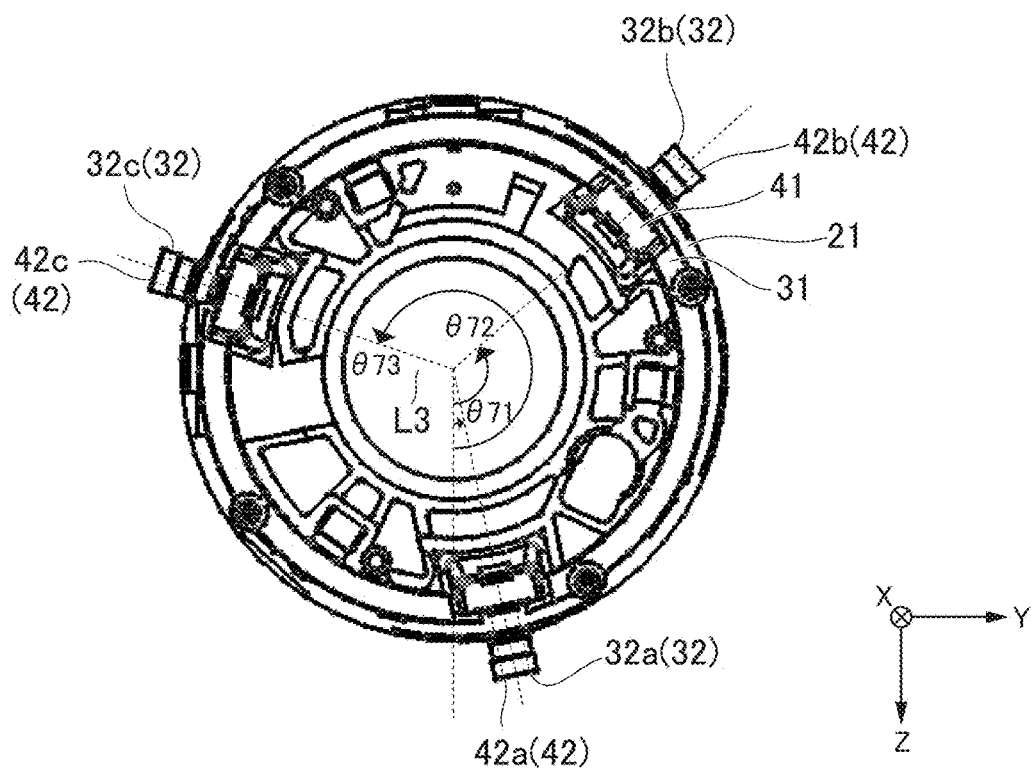
FIG. 7 is a view illustrating an example of the third/fifth lens moving barrel and a fourth lens moving barrel when viewed from an optical axis direction.

Next, the third/fifth lens moving barrel 31 will be described with reference to FIGS. 2, 6, 7, and the like. FIG. 6 is a view illustrating an example of an external configuration of the third/fifth lens moving barrel 31. FIG. 7 is a view illustrating an example of the third/fifth lens moving barrel 31 and the fourth lens moving barrel 41 when viewed from the optical axis direction. The third/fifth lens moving barrel 31 includes at least one cam follower of the cam follower 32a, the cam follower 32b, and the cam follower 32c illustrated in FIG. 6. In the following description, the cam follower 32a, the cam follower 32b, and the cam follower 32c will also be described collectively as the cam follower 32 unless they are distinguished from each other.

The third/fifth lens moving barrel 31 includes a hole portion 33a, a hole portion 33b, and a hole portion 33c. In the following description, the hole portion 33a, the hole portion 33b, and the hole portion 33c will also be described collectively as the hole portion 33 unless they are distinguished from each other. The cam follower 42 included in the fourth lens moving barrel 41 passes through the hole portion 33 and the rectilinear groove 141 that is included in the second lens fixed barrel 21, and then engages with the third cam groove 63 included in the rotary barrel 6. That is, the cam follower 42 is disposed in the hole portion 33.

Here, the cam follower 32 and the cam follower 42 of the fourth lens moving barrel 41 are disposed at the same location (angular position) as each other in the circumferential direction about the optical axis AX. That is, the cam follower 32 and the cam follower 42 are disposed side by side in the optical axis direction. Here, the angular position will be described with a line drawn in a vertical direction from the optical axis AX as 0 degrees. The cam follower 32a and the cam follower 42a are disposed at an angular position of θ71. The cam follower 32b and the cam follower 42b are disposed at angular positions of θ72. The cam follower 32c and the cam follower 42c are disposed at angular positions of θ73. In another example, an arrangement of the cam follower 32 and the cam follower 42 is not necessarily limited to being the same angular position and these may deviate from each other.

2-4. Focus Lens Unit 400

Figure 8:
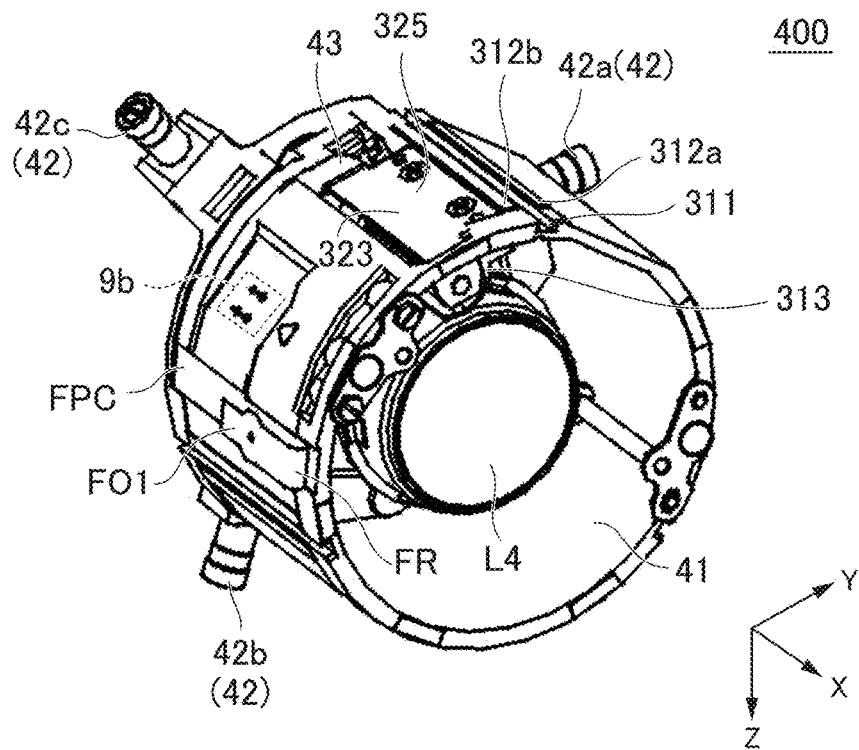
FIG. 8 is a view illustrating an example of an external configuration of the fourth lens moving barrel.

Next, a configuration of the focus lens unit 400 will be described with reference to FIGS. 2, 3, 8, and the like. FIG. 8 is a view illustrating an example of an external configuration of the fourth lens moving barrel 41. The focus lens unit 400 includes the fourth lens group L4, the fourth lens holding frame 40, the fourth lens moving barrel 41, and the actuator 43.

2-4-1. Fourth Lens Moving Barrel 41

The fourth lens moving barrel 41 includes at least one cam follower of the cam follower 42a, the cam follower 42b, and the cam follower 42c. In the following description, the cam follower 42a, the cam follower 42b, and the cam follower 42c will also be described collectively as the cam follower 42 unless they are distinguished from each other. Since rotation of the cam follower 42 is restricted by the rectilinear groove 141, rotation of the fourth lens moving barrel 41 around the optical axis AX is restricted with respect to the third/fifth lens moving barrel 31.

The actuator 43 is disposed on a radial inner side of the fourth lens moving barrel 41. The actuator 43 is connected to a control unit 101 via a flexible substrate (connecting portion) FPC. That is, the flexible substrate FPC electrically connects the actuator 43 to the control unit 101. The fourth lens group L4 is moved in the optical axis direction by the actuator 43.

2-4-2. Actuator 43

Figure 9:
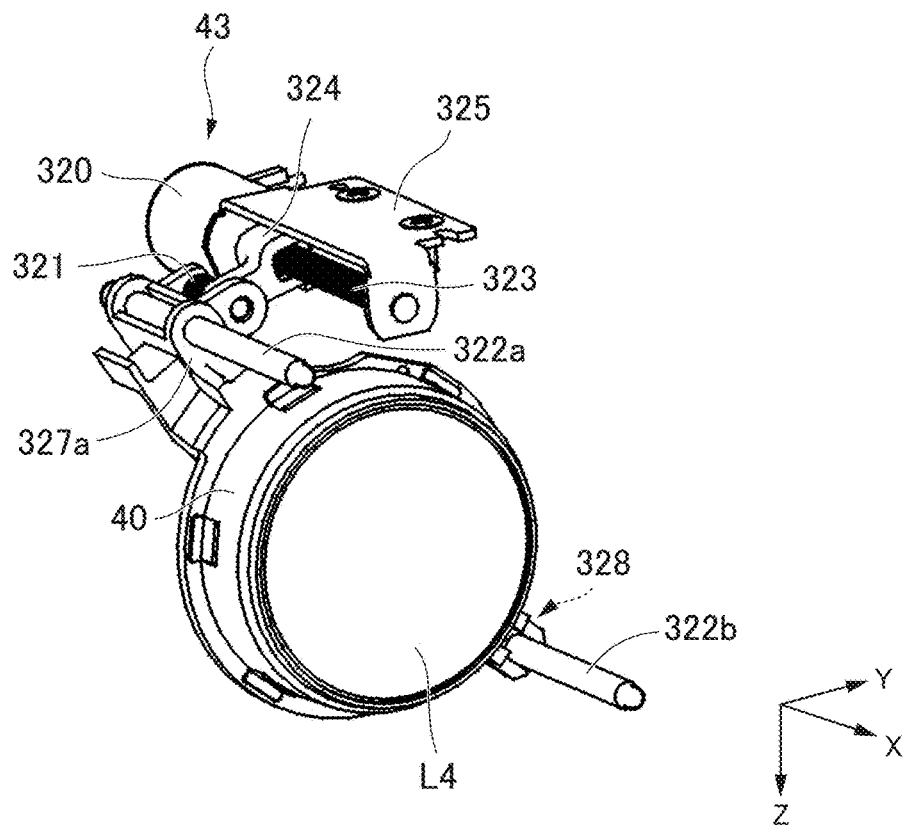
FIG. 9 is a view illustrating an example of a relationship between an actuator and a fourth lens group.

Here, the actuator 43 and the fourth lens group L4 will be described with reference to FIG. 9. FIG. 9 is a view illustrating an example of a relationship between the actuator 43 and the fourth lens group L4. The actuator 43 may be, for example, a stepping motor. In another example, the actuator 43 may be an ultrasonic motor, a voice coil motor, a piezo actuator, a linear actuator, or the like.

The focus lens unit 400 includes the fourth lens holding frame 40, a support plate 325, a drive source 320, a drive shaft 323, a rack member 324, an elastic member 321, and a guide shaft 322a and a guide shaft 322b.

The actuator 43 is fixed to the fourth lens moving barrel 41 via the support plate 325. The support plate 325 supports the drive source 320 and the drive shaft 323. The fourth lens holding frame 40 holds the fourth lens group L4. The drive shaft 323 is connected to the drive source 320. Also, the drive shaft 323 is connected to the fourth lens holding frame 40 via the rack member 324 and a connecting portion 327a. Further, the drive shaft 323 moves the fourth lens holding frame 40 in the optical axis direction due to a driving force supplied from the drive source 320.

The guide shaft 322a and the guide shaft 322b respectively support the fourth lens holding frame 40. The fourth lens holding frame 40 includes a support branch 328. The support branch 328 comes into contact with the guide shaft 322b according to a posture of the lens barrel 1. The support branch 328 supports the fourth lens holding frame 40 by being in contact with the guide shaft 322b.

The guide shaft 322a and the guide shaft 322b are disposed such that a force holding the fourth lens group L4 is not different between when a camera to which the lens barrel 1 is attached is at the normal position and when the camera to which the lens barrel 1 is attached is at a position tilted by 90 degrees from the normal position. The guide shaft 322a and the guide shaft 322b guide the fourth lens group L4 in the optical axis direction.

3. Details of Rotary Barrel 6

Figure 4:
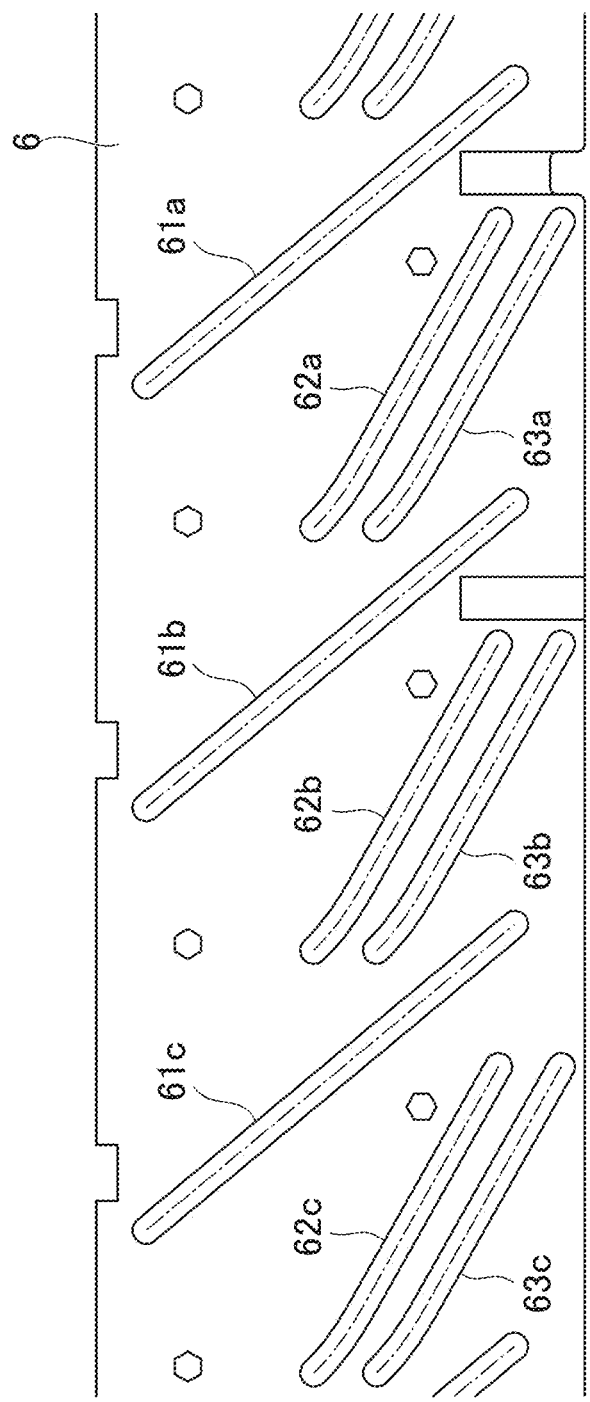
FIG. 4 is a view illustrating an example of a deployment of the rotary barrel.

Here, details of the rotary barrel 6 will be described with reference to FIG. 4. FIG. 4 is a view illustrating an example of a deployment of the rotary barrel 6.

As described above, the cam follower 32 of the third/fifth lens moving barrel passes through the rectilinear groove 141 included in the second lens fixed barrel 21 and engages with the second cam groove 62. Rotation of the cam follower 32 in the circumferential direction about the optical axis AX is restricted by the rectilinear groove 141. The cam follower 32 moves in the optical axis direction along a trajectory of the second cam groove 62.

The cam follower 42 of the fourth lens moving barrel 41 passes through the hole portion 33 included in the third/fifth lens moving barrel 31 and the rectilinear groove 141 included in the second lens fixed barrel 21, and then engages with the third cam groove 63. Rotation of the cam follower 42 in the circumferential direction about the optical axis AX is restricted by the rectilinear groove 141. The cam follower 42 moves in the optical axis direction along a trajectory of the third cam groove 63. The cam follower 12 of the first lens moving barrel 11 engages with the first cam groove 61. Therefore, when the rotary barrel 6 rotates in conjunction with the zoom operation ring 5a operated by a user, the first lens moving barrel 11, the third/fifth lens moving barrel 31, and the fourth lens moving barrel 41 move in the optical axis direction.

Next, an example of a defocus amount of the lens barrel 1 (varifocal amount) due to a shape of the cam groove of the second cam groove 62 and a shape of the cam groove of the third cam groove 63 will be shown with reference to FIGS. 4, 5, and 10 to 13. FIG. 5 is a view showing an example of a defocus amount of the lens barrel 1 when the shape of the cam groove of the second cam groove 62 and the shape of the cam groove of the third cam groove 63 are the same.

FIG. 5(A) is a graph showing a relationship between an object distance and a defocus amount. A horizontal axis represents an object distance, and a vertical axis represents a defocus amount. Also, three bar graphs show cases of wide-angle, middle, and telephoto in order from the left. With the same object distance, defocus amounts differ depending on a focal distance.

FIG. 5(B) shows a relationship between a rotation angle of the rotary barrel 6 and a movement amount of the third lens group L3 or the fifth lens group L5 in the optical axis direction, and a movement amount of the fourth lens group L4 in the optical axis direction. A horizontal axis represents a rotation angle of the rotary barrel 6, and a vertical axis represents a movement amount of the third lens group L3 or the fifth lens group L5 and a movement amount of the fourth lens group L4. When the shape of the cam groove of the second cam groove 62 and the shape of the cam groove of the third cam groove 63 are the same, as shown in FIG. 5(B), a movement amount in the optical axis direction of the third lens group L3 (or the fifth lens group L5) due to zooming is the same as a movement amount in the optical axis direction of the fourth lens group L4 due to zooming. When the shape of the cam groove of the second cam groove 62 and the shape of the cam groove of the third cam groove 63 are the same, a defocus amount is as shown in FIG. 5(A).

3-1. First Modified Example of Rotary Barrel 6

Figure 10:
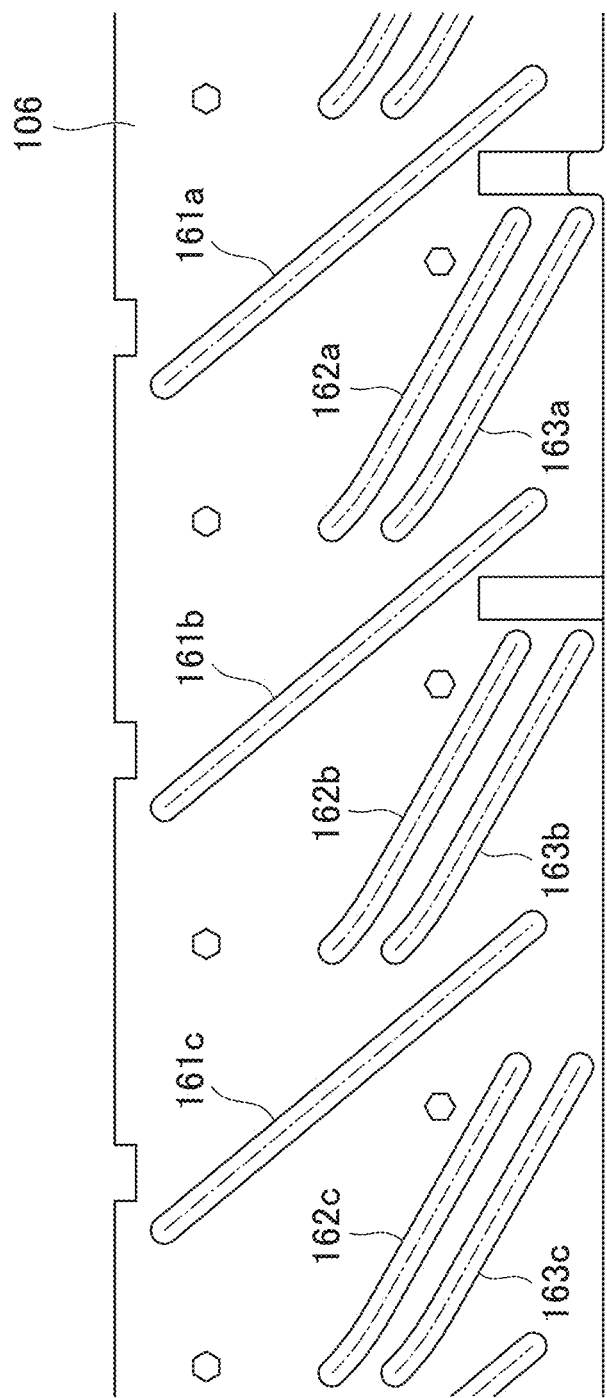
FIG. 10 is a view illustrating an example of a deployment of a rotary barrel in a first modified example.

A rotary barrel 106 as a modified example of the rotary barrel 6 will be described with reference to FIGS. 10 and 11. In the rotary barrel 106, a shape of the second cam groove and a shape of the third cam groove are different. FIG. 10 is a view illustrating an example of a deployment of the rotary barrel 106.

The rotary barrel 106 includes a first cam groove 161a, a first cam groove 161b, and a first cam groove 161c. In the following description, the first cam groove 161a, the first cam groove 161b, and the first cam groove 161c will also be described collectively as a first cam groove 161 unless they are distinguished from each other. The rotary barrel 106 includes a second cam groove 162a, a second cam groove 162b, and a second cam groove 162c. In the following description, the second cam groove 162a, the second cam groove 162b, and the second cam groove 162c will also be described collectively as the second cam groove 162 unless they are distinguished from each other. The rotary barrel 106 includes a third cam groove 163a, a third cam groove 163b, and a third cam groove 163c. In the following description, the third cam groove 163a, the third cam groove 163b, and the third cam groove 163c will also be described collectively as the third cam groove 163 unless they are distinguished from each other.

A trajectory of the second cam groove 162 and a trajectory of the third cam groove 163 are different from each other. In other words, a shape of the cam groove of the second cam groove 162 and a shape of the cam groove of the third cam groove 163 are different from each other.

Here, the shape of the third cam groove 163 is a shape corresponding to a defocus amount of the lens barrel 1. A shape corresponding to a defocus amount means a shape designed so that a defocus amount falls within a predetermined range of a defocus amount. By narrowing the predetermined range of the defocus amount or causing the predetermined range of the defocus amount to be within a range of a focal depth, optical performance of the lens barrel 1 can be enhanced.

FIG. 11 is a view showing an example of a defocus amount of the lens barrel 1 according to a shape of the cam groove of the second cam groove 162 and a shape of the cam groove of the third cam groove 163.

FIG. 11(A) is a graph showing a relationship between an object distance and a defocus amount. As shown in FIG. 11(A), the third cam groove 163 is formed so that a defocus amount is zero when an object distance is infinity. Further, it need not necessarily be zero, and a small defocus amount is allowable. With such a third cam groove 163, when zooming is performed with an object distance at infinity, it is not necessary to drive the actuator 43 with zoom tracking. Zoom tracking will be described below.

FIG. 11(B) shows a relationship between a rotation angle of the rotary barrel 106 and a movement amount of the third lens group L3 or the fifth lens group L5 in the optical axis direction, and a movement amount of the fourth lens group L4 in the optical axis direction. As described above, the shape of the cam groove of the third cam groove 163 has a shape corresponding to the defocus amount. Since shapes of the second cam groove 162 and the third cam groove 163 are different, movement amounts of the third lens group L3 (or the fifth lens group L5) and the fourth lens group L4 due to zooming are different.

That is, the fourth lens group L4 can be driven with a movement trajectory different from that of the front and rear lens groups L3 or L5. Thereby, the defocus amount can be adjusted. In the first modified example described above, the defocus amount is zero when the object distance is at infinity.

Also, when the shape of the second cam groove 162 and the shape of the third cam groove 163 are different from each other, the movement amount of the fourth lens group L4 in the optical axis direction due to zooming can be increased while the movement amount of the third lens group L3 or the fifth lens group L5 in the optical axis direction due to zooming is maintained to be small. Thereby, it becomes easier to adjust a defocus amount compared to a case in which a focus lens group moves together with other lens groups during zooming. Therefore, it becomes easier to design a zoom lens with a high magnification and/or a lens barrel with a shorter closest object distance.

3-2. Second Modified Example of Rotary Barrel 6

Figure 12:
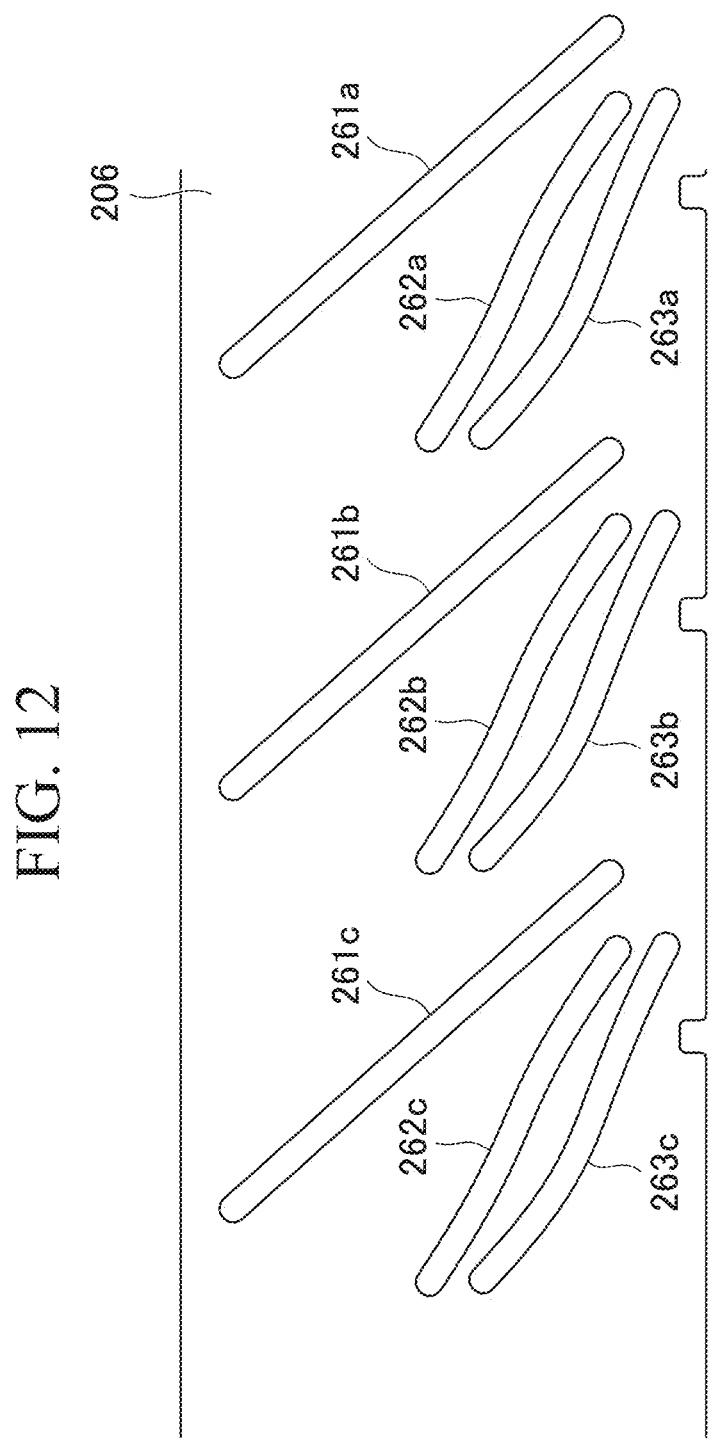
FIG. 12 is a view illustrating a deployment of a rotary barrel in a second modified example.

Next, a second modified example of the rotary barrel 6 will be described with reference to FIGS. 12 and 13. As described above, in the first modified example, the third cam groove 163 is formed so that a defocus amount is zero when an object distance is at infinity. The third cam groove of the second modified example is formed so that a defocus amount is reduced at any object distance. FIG. 12 is a view illustrating a deployment of a rotary barrel 206 in the second modified example.

The rotary barrel 206 includes a first cam groove 261a, a first cam groove 261b, and a first cam groove 261c. In the following description, the first cam groove 261a, the first cam groove 261b, and the first cam groove 261c will also be described collectively as a first cam groove 261 unless they are distinguished from each other. Further, in the following description, the above-described first cam groove 61, first cam groove 161, and first cam groove 261 will also be described collectively as a first cam groove unless they are distinguished from each other.

The rotary barrel 206 includes a second cam groove 262a, a second cam groove 262b, and a second cam groove 262c. In the following description, the second cam groove 262a, the second cam groove 262b, and the second cam groove 262c will also be described collectively as a second cam groove 262 unless they are distinguished from each other. Further, in the following description, the above-described second cam groove 62, second cam groove 162, and second cam groove 262 will also be described collectively as a second cam groove unless they are distinguished from each other.

The rotary barrel 206 includes a third cam groove 263a, a third cam groove 263b, and a third cam groove 263c. In the following description, the third cam groove 263a, the third cam groove 263b, and the third cam groove 263c will also be described collectively as a third cam groove 263 unless they are distinguished from each other. Further, in the following description, the above-described third cam groove 63, third cam groove 163, and third cam groove 263 will also be described collectively as a third cam groove unless they are distinguished from each other.

A shape of the second cam groove 262 and a shape of the third cam groove 263 are different from each other. The shape of the third cam groove 263 is a shape in which a defocus amount of the lens barrel 1 is set to a predetermined value or less. The predetermined value may be an arbitrary criterion such as 0.5, 0.4, 0.3, or the like.

FIG. 13 is a view showing an example of a defocus amount of the lens barrel 1 according to a shape of the cam groove of the second cam groove 262 and a shape of the cam groove of the third cam groove 263.

FIG. 13(A) is a graph showing a relationship between an object distance and a defocus amount. As shown in FIG. 13(A), the third cam groove 263 is formed so that a defocus amount is equal to or less than a predetermined value for all object distances and focal distances. With such a third cam groove 263, a driving amount of the actuator 43 due to zoom tracking during zooming can be reduced irrespective of the object distance. Further, the driving amount of the actuator 43 can be averaged.

FIG. 13(B) shows a relationship between a rotation angle of the rotary barrel 206 and a movement amount of the third lens group L3 or the fifth lens group L5 in the optical axis direction, and a movement amount of the fourth lens group L4 in the optical axis direction. Since shapes of the second cam groove 262 and the third cam groove 263 are different, movement amounts of the third lens group L3 (or the fifth lens group L5) and the fourth lens group L4 due to zooming are different. Thus, the fourth lens group L4 can be moved so that a defocus amount due to zooming is equal to or less than a predetermined value at any object distance.

If a shape of the cam groove of the second cam groove and a shape of the cam groove of the third cam groove can be made different from each other, a defocus amount at a certain rotation angle of the rotary barrel 6 can be adjusted.

(1) As described above, the fourth lens group L4 serving as a focus lens is held by a barrel different from that of other lens groups (L1, L2, L3, and L5). In other words, the barrel holding the focus lens is constituted by components different from those of barrels holding other lenses. Thereby, since a cam groove for moving the focus lens can be formed, a movement trajectory of the focus lens can be determined regardless of movement trajectory of other lenses. A degree of freedom in lens design can be increased.

(2) The rotary barrel 6, the rotary barrel 106 and the rotary barrel 206 include the third cam groove corresponding to the fourth lens moving barrel 41 and the second cam groove corresponding to the third/fifth lens moving barrel 31. Therefore, the fourth lens moving barrel 41 and the third/fifth lens moving barrel 31 can move forward and backward in the optical axis direction independently of each other.

(3) The rotary barrel 6, the rotary barrel 106 and the rotary barrel 206 include the third cam groove that sets a movement amount of the fourth lens moving barrel 41 due to zooming, and the second cam groove that sets a movement amount of the third/fifth lens moving barrel 31 due to zooming. Thereby, a movement amount of the fourth lens moving barrel 41 and a movement amount of the third/fifth lens moving barrel 31 can be set to desired movement amounts, respectively. That is, the movement amount of the focus lens and the movement amounts of other lenses can be set to desired amounts of movement, respectively. Further, a degree of freedom in design can be increased.

(4) When the focus lens and lenses other than the focus lens are disposed in the same barrel, the focus lens and the other lens integrally move at the time of zooming. In such a case, a defocus amount due to zooming cannot be adjusted. Particularly, the defocus amount increases in a zoom lens with a high magnification and/or a lens with a short object distance. In the present embodiment, by individually designing shapes of the second cam groove and the third cam groove, it is possible to individually set a movement trajectory of the focus lens and movement trajectories of the lenses other than the focus lens. Thereby, a defocus amount can be adjusted. That is, it is possible to design a lens barrel in which a defocus amount is zero when an object distance is at infinity, a lens barrel in which a defocus amount is equal to or less than a predetermined value at any object distance, or the like.

4. Zoom Tracking

Referring to FIG. 2 again, the lens barrel 1 includes the control unit 101. The control unit 101 may be constituted, for example, by a microcomputer (central processing unit (CPU), processor, circuitry), memory, and the like, and executes processing for realizing the focusing function of the fourth lens group L4. Also, the control unit 101 executes control of communication with a camera connected to the lens barrel 1, and other processing. In the present embodiment, the control unit 101 is included in the second lens fixed barrel 21. In another embodiment, the control unit 101 may be included in other barrels or components.

At the time of zooming, the control unit 101 controls the actuator 43 such that an object distance (focus position) does not change during zooming. For example, when the zoom operation ring 5*a* rotates, the fourth lens group L4 moves in the optical axis direction via the cam follower 42 and the like. At this time, as shown in FIGS. 5(A), 11(A) and 13(A), a defocus amount may be generated. Therefore, the control unit 101 drives the actuator 43 to move the fourth lens group L4 in the optical axis direction so that an object distance of the lens barrel 1 is not shifted. Specifically, the zoom detection unit 9*a* detects rotation of the zoom operation ring 5*a*. For example, the zoom detection unit 9*a* is included in the second lens fixed barrel 21, and detects a movement amount of the third/fifth lens moving barrel 31 with respect to the second lens fixed barrel 21. Alternatively, a rotation amount/a rotation angle of the zoom operation ring 5*a* and the rotary barrel 6 may be detected. The control unit 101 controls the actuator 43 on the basis of a detection value detected by the zoom detection unit 9*a* and moves the fourth lens group L4 toward a position at which an object distance does not change. Thereby, the control unit 101 moves the fourth lens group L4 to a position corresponding to the detection value detected by the zoom detection unit 9*a*. The position corresponding to the detection value detected by the zoom detection unit 9*a* is a position of the fourth lens group L4 at which the object distance is configured not to change before and after zooming. That is, the control unit 101 moves the fourth lens group L4 so that the object distance does not change due to zooming of the lens barrel 1. An operation of maintaining such a focusing state is called a zoom tracking operation. Due to the zoom tracking operation, the lens barrel 1 functions as a zoom lens in which the focus position does not change even when zooming is performed.

5. Hole Portion 33

Next, referring to FIG. 6 again, the hole portion 33 will be described. A length LX of the hole portion 33 in the optical axis direction is a length corresponding to a difference between a movement amount in the optical axis direction of the third/fifth lens moving barrel 31 moving along the second cam groove and a movement amount in the optical axis direction of the fourth lens moving barrel 41 moving along the third cam groove. The length corresponding to a difference in the movement amounts is a length in which a clearance or the like of the components is added to the difference in the movement amounts.

Movement amounts in the optical axis direction of the third/fifth lens moving barrel 31 and the fourth lens moving barrel 41 moving forward and backward by the above-described rotary barrel 106 or rotary barrel 206 in the optical axis direction are different from each other. By setting the length LX of the hole portion 33 in the optical axis direction to a length corresponding to a difference between a movement amount in the optical axis direction of the cam follower 32 that is engaged with the second cam groove and a movement amount in the optical axis direction of the cam follower 42 that is engaged with the third cam groove, the cam follower 42 and the third/fifth lens moving barrel 31 do not interfere with each other when the fourth lens moving barrel 41 moves forward and backward in the optical axis direction due to zooming.

The length LX of the hole portion 33 in the optical axis direction may be set to a length in which the cam follower 42 and the third/fifth lens moving barrel 31 do not interfere with each other. For example, it may be set to a length corresponding to a difference between the movement amount of the third/fifth lens moving barrel 31 and the movement amount of the fourth lens moving barrel 41.

6. Engaging Portion for Suppressing Deterioration of Optical Performance

Figure 14:
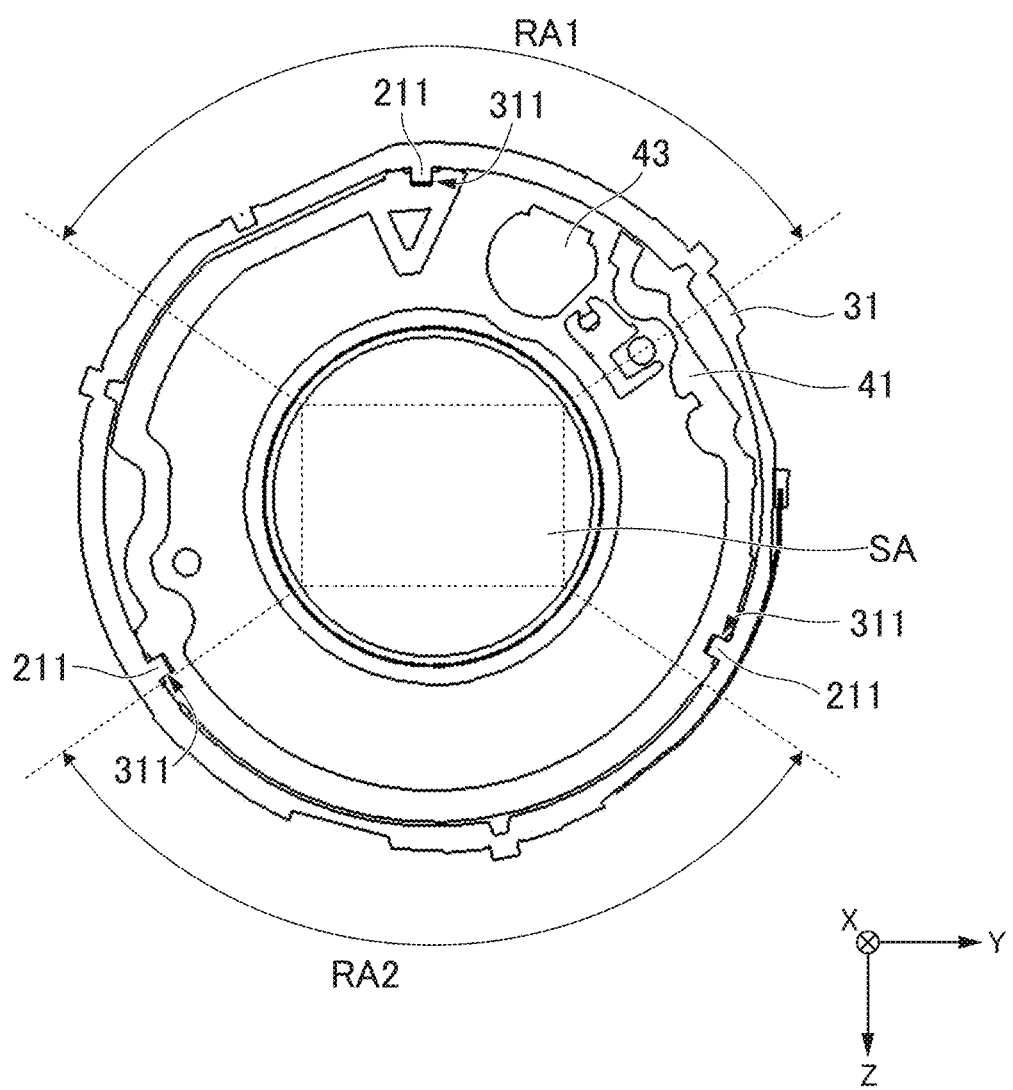
FIG. 14 is a view illustrating an example of a cross section of an imaging surface side of the lens barrel.

Next, a configuration for suppressing deterioration of optical performance of the lens barrel 1 will be described with reference to FIGS. 8 and 14. FIG. 14 is a view illustrating an example of a cross section of an imaging surface side of the lens barrel 1.

The third/fifth lens moving barrel 31 includes at least one first engaging portion 211. The first engaging portion 211 is provided on an inner circumferential side of the third/fifth lens moving barrel 31 and has a protruding shape (key, protruding portion) extending in the optical axis direction. The fourth lens moving barrel 41 includes at least one second engaging portion 311 that engages with the first engaging portion 211. The second engaging portion 311 is provided on an outer circumferential side of the fourth lens moving barrel 41 and has a depressed shape (groove, depressed portion) extending in the optical axis direction. In another example, the third/fifth lens moving barrel 31 may include the second engaging portion 311 having a depressed shape, and the fourth lens moving barrel 41 may include the first engaging portion 211 having a protruding shape.

By engaging the first engaging portion 211 with the second engaging portion 311, a deviation between the fourth lens moving barrel 41 and the third/fifth lens moving barrel 31 in a rotation direction around the optical axis AX can be suppressed.

As described above, rotation of the fourth lens moving barrel 41 around the optical axis AX is restricted by the cam follower 42 and the rectilinear groove 141. Thereby, deterioration of the optical performance due to the deviation of the fourth lens moving barrel 41 in the rotation direction can be prevented. Further, by engaging the first engaging portion 211 with the second engaging portion 311, rotation of the fourth lens moving barrel 41 about the optical axis AX is restricted. As a result, deterioration of the optical performance due to the deviation of the fourth lens moving barrel 41 in the rotation direction can be further suppressed.

Also, the fourth lens moving barrel 41 includes a raised portion (protruding portion) 312 along the second engaging portion 311 at a position away from the second engaging portion 311 in a circumferential direction. By providing a raised portion 312a and a raised portion 312b in the fourth lens moving barrel 41, engagement between the second engaging portion 311 and the first engaging portion 211 can be prevented from being released. Therefore, the engagement between the second engaging portion 311 and the first engaging portion 211 cannot be easily released, for example, even when an external impact is applied to the fourth lens moving barrel 41. Thereby, deterioration of the optical performance of the lens barrel 1 can be suppressed.

Further, as illustrated in FIG. 6, the third/fifth lens moving barrel 31 includes at least one third engaging portion 212. The third engaging portion 212 is provided on an outer circumferential side of the third/fifth lens moving barrel 31, and has a protruding shape (key, protruding portion) extending in the optical axis direction. The second lens fixed barrel 21 includes at least one fourth engaging portion 111 (not illustrated) that engages with the third engaging portion 212. The fourth engaging portion 111 is provided on an inner circumferential side of the second lens fixed barrel 21, and has a depressed shape (groove, depressed portion) extending in the optical axis direction. In another example, the third/fifth lens moving barrel 31 may include the fourth engaging portion 111 having a depressed shape, and the second lens fixed barrel 21 may include the third engaging portion 212 having a protruding shape.

By engaging the third engaging portion 212 with the fourth engaging portion 111, a deviation between the third/fifth lens moving barrel 31 and the second lens fixed barrel 21 in a rotation direction about the optical axis AX can be suppressed. As described above, rotation of the third/fifth lens moving barrel 31 around the optical axis AX is restricted by the cam follower 32 and the rectilinear groove 141. Thereby, deterioration of the optical performance due to the deviation of the third/fifth lens moving barrel 31 in the rotation direction can be prevented. Further, by engaging the third engaging portion 212 with the fourth engaging portion 111, rotation of the third/fifth lens moving barrel 31 about the optical axis AX is restricted. As a result, deterioration of the optical performance due to the deviation of the third/fifth lens moving barrel 31 in the rotation direction can be further prevented.

7. Flexible Substrate

Next, an arrangement of the flexible substrate FPC will be described with reference to FIGS. 2, 6, and 8. The flexible substrate FPC electrically connects the actuator 43 to the control unit 101. Specifically, the actuator 43 is connected to the control unit 101 through a first through hole (hole portion) 214 included in the third/fifth lens moving barrel 31 and a second through hole (hole portion) 215 (not illustrated) included in the second lens fixed barrel 21. More specifically, the flexible substrate FPC includes a substrate end portion FO1 illustrated in FIG. 8. The substrate end portion FO1 is disposed on a radial outer surface in a surface of the third/fifth lens moving barrel 31 through the first through hole 214. Further, the substrate end portion FO1 includes a bent portion FR having a length corresponding to a difference between a movement amount in the optical axis direction of the third/fifth lens moving barrel 31 moving along the second cam groove, and a movement amount in the optical axis direction of the fourth lens moving barrel 41 moving along the third cam groove. The substrate end portion FO1 disposed on a radial outer side of the third/fifth lens moving barrel 31 through the first through hole 214 is connected to another flexible substrate (not illustrated) via a connector. Another flexible substrate (not illustrated) is connected to the control unit 101 through a second through hole 215 included in the second lens fixed barrel 21.

With the second through hole 215 included in the second lens fixed barrel 21, it is possible to pass the flexible substrate from the radial inner side of the second lens fixed barrel 21. Also, with the first through hole 214 included in the third/fifth lens moving barrel 31, it is possible to pass the substrate end portion from the radial inner side of the third/fifth lens moving barrel 31. Thereby, the control unit 101 is electrically connected to the actuator 43 disposed in a frame different from the frame in which the control unit 101 is disposed by the flexible substrate FPC. Accordingly, the control unit 101 and the actuator 43 may not be disposed in the same frame, and thus a degree of freedom in design can be improved.

8. Arrangement of Actuator

Next, an arrangement of the actuator 43 will be described with reference to FIG. 14. The actuator 43 is disposed in the fourth lens moving barrel 41. Also, the actuator 43 is disposed between the cam follower 42 and the second engaging portion 311 in the circumferential direction of the optical axis AX. Further, the actuator 43 is disposed in a predetermined angular range based on an imaging angle of view SA. The imaging angle of view SA is an angle of view corresponding to a landscape image to be captured. Here, in ranges divided into four by extending diagonal lines of the imaging angle of view SA, the predetermined angular range is an angular range in a +Z direction with respect to a longitudinal direction of the imaging angle of view SA or in a −Z direction with respect to the longitudinal direction of the imaging angle of view SA. In this example, the predetermined angular range is disposed in a range of a range RA1 or a range RA2.

Generally, light incident on a lens barrel is scattered by surfaces of components in the lens barrel such as an actuator, and ghosting is generated by the scattered light. Depending on a disposition position of the actuator in the lens barrel, an influence of ghosting may be increased. Therefore, it is preferable that the disposition position of the actuator be within the predetermined angular range in which an influence of ghosting is reduced. By disposing the actuator 43 within the predetermined angle range, an influence of ghosting can be suppressed.

8-1. Light Shielding Portion

Next, a light shielding portion 313 will be described with reference to FIG. 8. The fourth lens moving barrel 41 includes a light shielding portion 313 disposed at a position parallel to the optical axis direction and covering at least a portion of the actuator 43. The light shielding portion 313 is a member having a length corresponding to a position in which the fourth lens group L4 in the fourth lens moving barrel 41 moves forward and backward. In this example, the light shielding portion 313 has a shape covering the drive shaft 323 of the actuator 43. The light shielding portion 313 suppresses light irradiated to the drive shaft 323. Thereby, the fourth lens moving barrel 41 can curtail light influencing an image being captured.

Although the embodiments of the present invention have been described above, the technical scope of the present invention is not limited to the scope described in the above embodiments. It will be apparent to those skilled in the art that various modifications or improvements can be added to the above embodiments. It is obvious from the description of the scope of the claims that modes with such modifications or improvements can be included in the technical scope of the present invention. Also, the present invention is not limited to the embodiments described above, and may also include any combination of these configurations.

REFERENCE SIGNS LIST

1 Lens barrel
5a Zoom operation ring
6 Rotary barrel
9b Focus detection unit
21 Second lens fixed barrel
33 Hole portion
31 Third/fifth lens moving barrel
42 Cam follower
43 Actuator
62, 162, 262 Second cam groove
63, 163, 263 Third cam groove
141 Rectilinear groove
322a, 322b Guide shaft
400 Focus lens unit
FPC Flexible substrate

The invention claimed is:

1. A lens barrel comprising:
a first lens;
an actuator that drives the first lens;
a first barrel that holds the actuator and moves in an optical axis direction, the first barrel including a cam follower;
a second lens;
a third lens; and
a second barrel that holds the second lens and the third lens, the second barrel including a first hole portion in which the cam follower is disposed, the first hole portion being disposed between the second lens and the third lens in the optical axis direction.

2. The lens barrel according to claim 1, wherein the first barrel is disposed at an inner circumferential side of the second barrel.

3. The lens barrel according to claim 1, further comprising:
a third barrel including a cam groove that engages with the cam follower.

4. The lens barrel according to claim 3, wherein the third barrel rotates according to a zoom operation.

5. The lens barrel according to claim 1, wherein a length of the first hole portion in the optical axis direction is based on an amount of movement of the first barrel with respect to the second barrel.

6. The lens barrel according to claim 1, further comprising:
a control unit that controls the actuator; and
a connecting portion that electrically connects the actuator to the control unit, wherein
the second barrel includes a second hole portion in which the connecting portion is disposed.

7. The lens barrel according to claim 6, further comprising:
a fixed barrel that holds the control unit and includes a third hole portion in which the connecting portion is disposed.

8. The lens barrel according to claim 7, wherein the fixed barrel includes a rectilinear groove in which the cam follower is disposed.

9. The lens barrel according to claim 1, wherein
the first barrel includes a first engaging portion having a length in the optical axis direction, and
the second barrel includes a second engaging portion that engages with the first engaging portion.

10. The lens barrel according to claim 9, wherein the first engaging portion is a protruding shape or a depressed shape extending in the optical axis direction.

11. The lens barrel according to claim 9, wherein the actuator is disposed between the cam follower and the first engaging portion in a circumferential direction about the optical axis.

12. The lens barrel according to claim 1, wherein
the second lens is located at one end of the second barrel in the optical axis direction, and
the third lens is located at another end of the second barrel in the optical axis direction.

13. An imaging device comprising:
the lens barrel according to claim 1; and
a main body including an imaging device.

* * * * *